Patented July 27, 1937

2,087,959

UNITED STATES PATENT OFFICE 2,087,959

ARYL MERCURY COMPOUNDS OF HETEROCYCLIC IMINES AND IMIDES

Carl N. Andersen, Watertown, Mass., assignor to Lever Brothers Company, a corporation of Maine No Drawing. Application November 22, 1934, Serial No. 754,374

18 Claims. (Cl. 260—13)

The present invention relates to the production of certain new organic mercury compounds.

It is the object of my invention to produce new organic mercury compounds useful as germicides and for other therapeutic purposes.

More particularly, it is an object of my invention to prepare certain new organic mercury compounds which may be regarded as derivatives of an imine or imide of a type in which the nitrogen is part of a ring. These compounds are often referred to as heterocyclic compounds containing nitrogen in the nucleus. I shall refer to them as "heterocyclic imines" and "heterocyclic imides."

I have discovered that when the essential radical corresponding to certain aromatic mercury compounds is attached to the nitrogen in the heterocyclic imine or imide, compounds are produced which have extraordinarily high potency as antiseptics and germicides and at the same time are characterized by relatively low toxicity and other desirable properties.

The compounds constituting the subject matter of my invention may be described as having the general formula $(RHg)_x \cdot R_1$, in which R represents an aromatic structure, to a nuclear carbon atom of which the mercury is directly attached; in which $x$ represents the number of RHg groups in the compound and is an integer, usually of one, but may be more if there is more than one nitrogen atom in the ring or more than one heterocyclic ring forming a polynuclear compound; and in which $R_1$ represents a radical corresponding to an organic compound having one or more imino or imido groups as part of a ring structure that is linked to the RHg group, or groups, through attachment to the nitrogen atom. The compounds will all, therefore, contain one or more of the characteristic groups:

in which the nitrogen is in a ring structure.

While the word "group" is used hereinafter, it is obvious that it is to be understood as plural where the value of $x$ is more than one.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

The radical $R_1$ more particularly represents a heterocyclic imine or imide radical. This radical may have any number of atoms in the ring and other elements besides the imino or imido nitrogen and the carbon. There may be more than one imino or imido nitrogen in a single ring to form more than one imino or imido group. The ring containing the imino or imido nitrogen may be part of a condensed or interconnected polynuclear structure; more than one ring of such a structure may contain an imino or imido group.

The following are examples of heterocyclic imides falling within the above defined class: benzoyl sulfimide

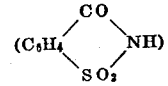

phthalimide, succinimide, pyrrole, naphthalimide, indole, carbazole, isatin, piperidine, 3-nitrophthalimide, glycine anhydride (diketo piperazine), piperazine (diethylene diamine), acridone, xanthine theophylline, emetin, pyrrolidine, Indigo ("Schultz" #1301; "Colour Index" #1177), Indamine Blue ("Schultz" #1234; "Colour Index" #1113), and Indathrene Red Violet ("Schultz" #1260; "Colour Index" #1161).

Many dyes, such as the last three compounds listed, contain an imino group which is part of a cyclic structure. I find that the aromatic mercury derivatives of these compounds are very satisfactory as germicides and I intend my invention to include them.

I have prepared the aromatic mercury salts corresponding to all of the above noted heterocyclic imines and imides. The preparation of these compounds, together with other imines and imides I have investigated, comprise a sufficiently representative number of the above defined class to lead me to believe that all heterocyclic imines and imides can be employed to produce my novel mercury compounds. The compounds so prepared have, in greater or lesser, but always in relatively high degree, desirable antiseptic and germicidal properties. I therefore regard my invention as generic to and including the entire group of heterocyclic imines and imides.

A general method of preparing these compounds consists in reacting together the heterocyclic imine or imide and a compound containing an aromatic mercury radical of the above mentioned type. A common solvent for both reacting components is employed. The compound resulting from the reaction is usually relatively insoluble as compared with the reacting components, and upon its precipitation may be filtered, washed and dried. In my application Serial No. 754,372, filed November 22, 1934, I have disclosed a general method of preparing aromatic mercury compounds of this type by reacting an imine or imide with an aromatic mercury hydroxide. This process has the advantage that water is the only other product produced and the resulting compound may be easily purified. In my application Serial No. 694,200, filed October 18, 1933, I have disclosed another general method of preparing aromatic mercury compounds of this type by employing a soluble aromatic mercury salt, for example, the acetate, in a reaction with an imine or imide. The aromatic mercury compound produced is of relatively low solubility as compared with the aromatic mercury salt and is relatively insoluble as compared with the imine or imide. Either of these two general methods may be employed in producing the compounds comprising this invention. In so far as I am aware the ring structure of the imine or imide is not disturbed, and the structure of the imine or imide remains intact except for the replacement of the imine or imide hydrogen.

The following examples are given merely as illustrative of a method by which all the compounds of this group may be prepared as well as to illustrate representative organic mercury derivatives of imino or imido compounds falling within the scope of my invention.

*Example 1*

17.64 grams of phenylmercury hydroxide is dissolved in 4 liters of water and heated until solution is complete. The solution is filtered to remove any insoluble material. To the filtrate is added an aqueous solution of 12.07 grams of ortho benzoyl sulfimide (saccharin). The solution is then evaporated to one-half of its volume and on cooling, a white material separates. This precipitate is separated by filtration, washed well with water, and then recrystallized from alcohol.

20.16 grams of phenylmercury acetate is dissolved in 2 liters of water and heated until solution is complete. The solution is filtered to remove any insoluble material. To the filtrate is added 12.07 grams of ortho benzoyl sulfimide (saccharin) dissolved in 50 cc. of water. A white precipitate results and after the mixture has been allowed to stand for 12 hours the precipitate is separated by filtration, filtered, washed well with warm water and dried.

The compound prepared by both methods is the same and has a melting point of 212° C. The compound is phenylmercury ortho benzoyl sulfimide which may also be denoted as phenylmercury sulfimido benzoate.

*Example 2*

17.64 grams of phenylmercury hydroxide is dissolved in 4 liters of water and heated until solution is complete. The solution is filtered to remove any insoluble material. To the warm solution is added 9.70 grams of phthalimide. A precipitate results. The material is allowed to cool and is then set aside for 24 hours after which it is filtered, washed with distilled water and dried. The melting point of the material is 210–212° C. The compound is phenylmercury phthalimide.

*Example 3*

40.32 grams of phenylmercury acetate is dissolved in 4 liters of water and heated until solution is complete. The solution is filtered to remove any insoluble material. To the filtrate is added 37.18 grams of N carbazole dissolved in one liter of alcohol. A voluminous white precipitate results. The mixture is allowed to stand after which it is filtered, and the precipitate washed well with warm water and dried. After the precipitate is recrystallized from alcohol it has a melting point of 216–218° C. The compound is phenylmercury N carbazole.

*Example 4*

17.64 grams of phenylmercury hydroxide is dissolved in 4 liters of water and heated until solution is complete. The solution is filtered to remove any insoluble material. To the filtrate is added 9.7 grams of N indole dissolved in 100 cc. of alcohol. A milky solution results and the mixture is alowed to stand and cool, during which time crystals separate on the side and bottom of the container. The crystalline precipitate is separated by filtration and washed well with warm water and alcohol and then dried. It melts at 155–156° C. The compound is phenylmercury N indole.

*Example 5*

17.64 grams of phenylmercury hydroxide is dissolved in 2 liters of water and heated until solution is complete. The solution is then filtered to remove any insoluble material. To the filtrate is added a solution of 200 cc. of alcohol containing 11.70 grams of N acridone. A greenish yellow crystalline precipitate results. After the mixture has been allowed to cool it is filtered, and the precipitate washed well with warm water, and dried. It darkens above 200° C., and does not melt at 250° C. The compound is phenylmercury N acridone.

*Example 6*

40.32 grams of phenylmercury acetate is dissolved in 2 liters of water and heated until solution is complete. The solution is filtered to remove any insoluble material. To the filtrate is added 19.4 grams of isatin dissolved in 400 cc. of alcohol. A red precipitate results and the mixture is allowed to stand until cool after which it is filtered. The precipitate is washed well with warm water and 50 cc. alcohol and dried. Upon recrystallization from alcohol the material melts and decomposes at 277–278° C. and maintains its red color up to that temperature. The compound is phenylmercury isatin.

*Example 7*

3.12 grams of phenylmercury chloride is dissolved in 8 liters of 95% alcohol. The application of heat is desirable due to the difficulty with which the compound dissolves. To the solution is added 2.17 grams of chloroimino sulfo benzoic acid dissolved in alcohol. When solution is complete, 3 grams of small crystals of sodium iodide are added. Iodine is set free, indicating that a reaction has taken place. The mixture is concentrated to eighty per cent its original volume and allowed to stand overnight. White glistening crystals separate on the surface which do not melt at 360° C. On further evaporation, a yellowish-brown product separates which after washing well with water and drying does not melt at 360° C. In addition to the two organic compounds mentioned above, sodium chloride also separates out as the resulting product from the condensation.

In the above example I have been unable to definitely identify the structure of the resulting compound. From a theoretical consideration it would appear that the compound should have the same structure as the phenylmercury compound prepared from ortho-benzoic sulphinide. However, the properties of the two compounds differ slightly. I believe that the compound produced in the previous example, however, is an aromatic mercury imide and falls within the general group of compounds comprising my invention.

From the specific examples given it will be obvious to one skilled in the art what procedure is to be followed in producing other heterocyclic imines and imides. Theoretical quantities are generally employed. If desired in some cases approximately 10% excess of the imine or imide may be used in order to insure complete conversion of the aromatic mercury compound.

The operativeness of the process is not found to depend in any degree upon the temperature at which the reaction is effected. It is convenient to use heat because it facilitates the solution of the reacting components, and speeds the reaction, but the process can be carried out at any temperature, for example, room temperature. Similarly, the process may be carried out in any mutual solvent. Water is usually employed for reasons of convenience when the reacting components are water-soluble but if not other solvents, such as the alcohols, or acetone or mixtures of these with each other or with water, may be used.

All of the compounds produced as above described are characterized by extraordinarily high potency as germicides. Tests to determine their efficacy in killing B. typhosus and Staph. aureus were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

As illustrative of the potency of the compounds, the killing power of the following compounds is given merely as illustrative:

The figures represent the maximum dilutions at which killing in 15 minutes resulted:

|  | B. typhosus | Staph. aureus |
| --- | --- | --- |
| Phenylmercury ortho benzoyl sulfimide | 1:60,000 | 1:30,000 |
| (Recrystallized) | 1:40,000 | 1:25,000 |
| Phenylmercury phthalimide | 1:90,000 | 1:20,000 |
| Phenylmercury succinimide | 1:70,000 | 1:40,000 |
| Phenylmercury naphthalimide (in alcohol) | 1:100,000 | 1:35,000 |
| Phenylmercury N indole | 1:60,000 | 1:45,000 |
| Phenylmercury N carbazole | 1:52,500 | 1:45,000 |
| Phenylmercury 3-nitrophthalimide | 1:80,000 | 1:60,000 |
| Phenylmercury glycine anhydride (diketo piperazine) | 1:80,000 | 1:70,000 |

|  | B. coli | B. subtelis (spores) |
| --- | --- | --- |
| Phenylmercury ortho benzoyl sulfimide | 1:20,000 | 1:15,000 |

These compounds are further characterized by particularly desirable properties from the standpoint of relative freedom from toxicity and their adaptability for various germicidal and therapeutic uses. Tests made with some of them, for example, the ortho benzoyl sulfimide, indicate that they are not only especially well suited for use as a germicide, but also that they have other uses in medicine, for example, they may be used as a hypnotic or as a sedative, and may be administered internally, intravenously, and peritoneally with excellent results.

All of these compounds retain a high germicidal value when incorporated in soaps or mixed with various menstrums in forming antiseptic and germicidal compositions.

These new compounds may be used directly as germicides in aqueous or other solutions, or may be formed into various preparations such as mouth washes, tooth pastes, soaps, ointments, etc.

This application is a continuation in part of my earlier filed application Serial No. 694,203, filed October 18, 1933.

I claim:

1. A new organic mercury compound of the general formula $(RHg)_x \cdot R_1$, in which R represents an aromatic structure in which none of the carbon atoms has direct linkage with any element other than hydrogen, carbon and mercury; in which $R_1$ represents a heterocyclic radical containing an $=NH$ group that is linked to the RHg group through attachment to the nitrogen atom in the $=NH$ group; and in which $x$ represents the number of RHg groups in the compound and is an integer having a value of at least one and not more than the number of imido nitrogens in the radical $R_1$.

2. A new organic mercury compound of the general formula $(RHg)_x \cdot R_1$, in which R represents an aromatic structure in which none of the carbon atoms has direct linkage with any element other than hydrogen, carbon and mercury; in which $R_1$ represents a mononuclear heterocyclic radical containing an $=NH$ group that is linked to the RHg group through attachment to the nitrogen atom in the $=NH$ group; and in which $x$ represents the number of RHg groups in the compound and is an integer having a value of at least one and not more than the number of imido nitrogens in the radical $R_1$.

3. A new organic compound of the general formula $(RHg)_2 \cdot R_1$, in which R represents an aromatic structure in which none of the carbon atoms has direct linkage with any other element than hydrogen, carbon and mercury; and in which $R_1$ represents a mononuclear heterocyclic radical containing two $=NH$ groups, which radical is linked to the RHg groups through attachment to the nitrogen atom in the $=NH$ groups.

4. A new organic mercury compound of the general formula $RHg \cdot R_1$, in which R represents an aromatic structure in which none of the carbon atoms has direct linkage with any other element than hydrogen, carbon and mercury; and in which $R_1$ represents a mononuclear heterocyclic radical containing an $=NH$ group that is linked to the RHg group through attachment to the nitrogen atom of the $=NH$ group.

5. A new organic mercury compound of the general formula $(RHg)_x \cdot R_1$, in which R represents an aromatic structure in which none of the carbon atoms has direct linkage with any element other than hydrogen, carbon and mercury; in which $R_1$ represents a polynuclear heterocyclic radical containing an $=NH$ group that is linked to the RHg group through attachment to the nitrogen atom in the $=NH$ group; and in which $x$ represents the number of RHg groups in the compound and is an integer having a value of at least one and not more than the number of imido nitrogens in the radical $R_1$.

6. A new organic mercury compound of the general formula $(RHg)_x \cdot R_1$, in which R represents an aromatic structure in which none of the carbon atoms has direct linkage with any element other than hydrogen, carbon and mercury; in which $R_1$ represents a polynuclear heterocyclic radical containing an =NH group, and comprising a condensed benzene ring and a heterocyclic ring, said radical being linked to the RHg group through attachment to the nitrogen atom in the =NH group; and in which $x$ represents the number of RHg groups in the compound and is an integer having a value of at least one and not more than the number of imido nitrogens in the radical $R_1$.

7. A new organic mercury compound of the general formula $(RHg)_x \cdot R_1$, in which R represents an aromatic structure in which none of the carbon atoms has direct linkage with any element other than hydrogen, carbon and mercury; in which $R_1$ represents a polynuclear heterocyclic radical containing an imido group, and comprising a condensed benzene ring and a heterocyclic ring containing sulphur, said group being linked to the RHg group through attachment to the nitrogen atom in the imido group; and in which $x$ represents the number of RHg groups in the compound and is an integer having a value of at least one and not more than the number of imido nitrogens in the radical $R_1$.

8. A new organic mercury compound of the general formula $RHg \cdot R_1$, in which R represents an aromatic structure in which none of the carbon atoms has direct linkage with any other element than hydrogen, carbon and mercury; and in which $R_1$ represents a polynuclear heterocyclic radical containing an =NH group that is linked to the RHg group through attachment to the nitrogen atom of the =NH group.

9. A new organic mercury compound of the general formula $(C_6H_5Hg)_x \cdot R_1$, in which $R_1$ represents a heterocyclic radical containing an =NH group that is linked to the RHg group through attachment to the nitrogen atom in the =NH group; and in which $x$ represents the number of $C_6H_5Hg$ groups in the compound and is an integer having a value of at least one and not more than the number of imido nitrogens in the radical $R_1$.

10. A new organic mercury compound of the general formula $(C_6H_5Hg)_x \cdot R_1$, in which $R_1$ represents a mononuclear heterocyclic radical containing an =NH group that is linked to the RHg group through attachment to the nitrogen atom in the =NH group; and in which $x$ represents the number of $C_6H_5Hg$ groups in the compound and is an integer having a value of at least one and not more than the number of imido nitrogens in the radical $R_1$.

11. A new organic mercury compound of the general formula $(C_6H_5Hg)_x \cdot R_1$, in which $R_1$ represents a mononuclear heterocyclic imido radical containing two =NH groups, which radical is linked to the RH groups through attachment to the nitrogen atom in the =NH groups.

12. A new organic mercury compound of the general formula $C_6H_5Hg \cdot R_1$, in which $R_1$ represents a mononuclear heterocyclic radical containing an =NH group that is linked to the RHg group through attachment to the nitrogen atom of the =NH group.

13. A new organic mercury compound of the general formula $(C_6H_5Hg)_x \cdot R_1$, in which $R_1$ represents a polynuclear heterocyclic radical containing an =NH group that is linked to the RHg group through attachment to the nitrogen atom in the =NH group; and in which $x$ represents the number of $C_6H_5Hg$ groups in the compound and is an integer having a value of at least one and not more than the number of imido nitrogens in the radical $R_1$.

14. A new organic mercury compound of the general formula $(C_6H_5Hg)_x \cdot R_1$, in which $R_1$ represents a polynuclear heterocyclic radical containing an imido group and comprising a condensed benzene ring and a heterocyclic ring containing sulphur, said group being linked to the RHg group through attachment to the nitrogen atom in the imido group; and in which $x$ represents the number of $C_6H_5Hg$ groups in the compound and is an integer having a value of at least one and not more than the number of imido nitrogens in the radical $R_1$.

15. A new organic mercury compound of the general formula $C_6H_5Hg \cdot R_1$, in which $R_1$ represents a polynuclear heterocyclic radical containing an =NH group that is linked to the RHg group through attachment to the nitrogen atom of the =NH group.

16. Phenylmercury ortho-benzoyl sulfimide.
17. Phenylmercury indole.
18. Phenylmercury pyrrole.

CARL N. ANDERSEN.